UNITED STATES PATENT OFFICE.

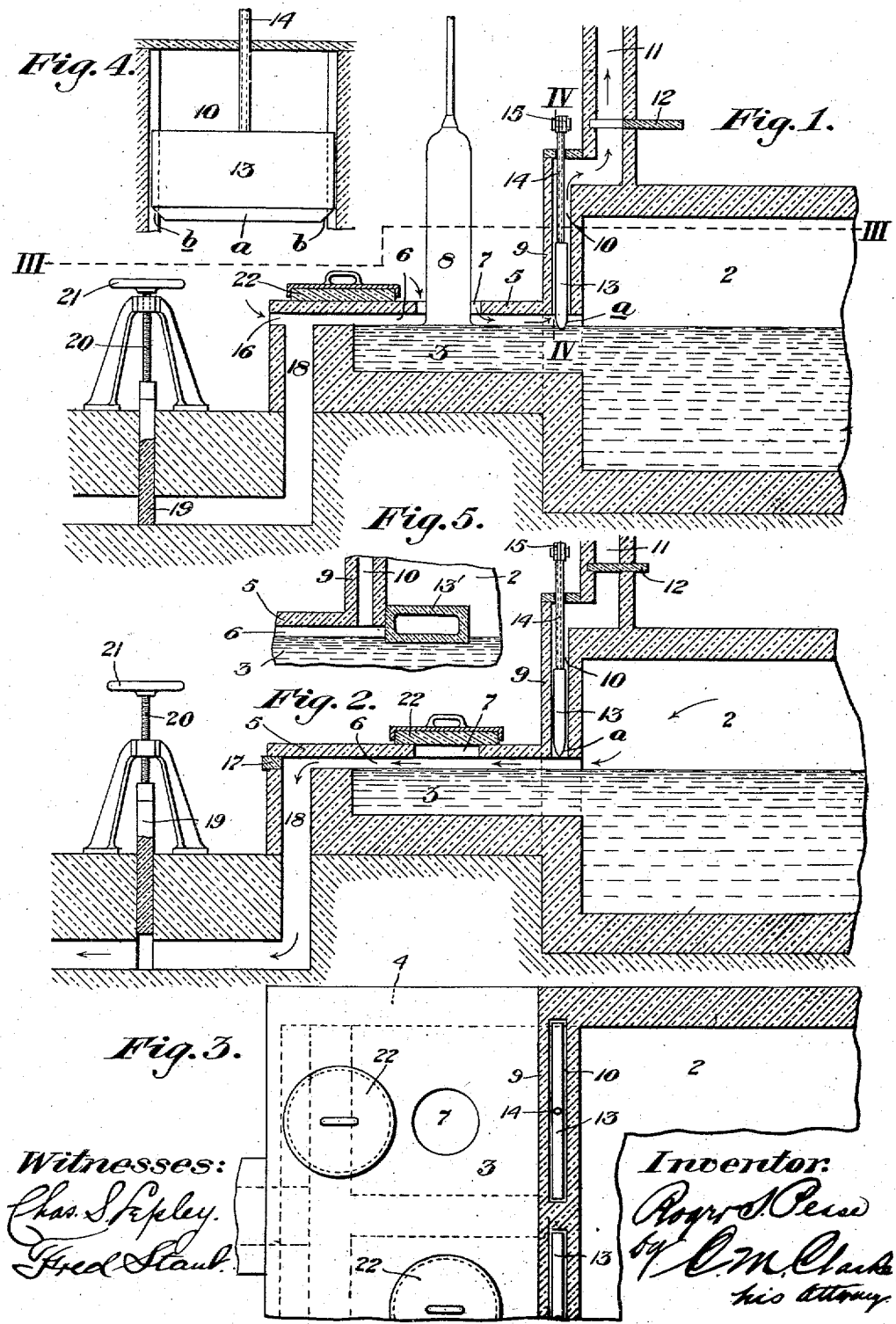

ROGER S. PEASE, OF ALLEGHENY, PENNSYLVANIA, ASSIGNOR TO ALFRED M. LEE, TRUSTEE, OF PITTSBURG, PENNSYLVANIA.

GLASS-FURNACE AND METHOD OF MANUFACTURING GLASS ARTICLES THEREIN.

967,966.  Specification of Letters Patent.  Patented Aug. 23, 1910.

Application filed October 15, 1907. Serial No. 397,497.

*To all whom it may concern:*

Be it known that I, ROGER S. PEASE, a citizen of the United States, residing at Allegheny, in the county of Allegheny and State of Pennsylvania, have invented certain new and useful Improvements in Glass-Furnaces and Methods of Manufacturing Glass Articles Therein, of which the following is a specification, reference being had therein to the accompanying drawing.

My invention consists in improvements in glass furnaces or tanks and is particularly adapted for use in the manufacture of window glass, by drawing the cylinder from molten metal.

It has for its objects to provide a construction whereby a supply of fined glass is furnished for the drawing operation communicating with the main tank with means for cutting off or establishing circulation of the gases both outwardly from the furnace and inwardly from the outside atmosphere, and it is constructed and adapted to operate in the manner more fully hereinafter described.

Referring to the drawings: Figure 1 is a longitudinal sectional view of a portion of a glass furnace or tank provided with my improved construction illustrating the drawing operation. Fig. 2 is a similar view showing the drawing opening closed and illustrating the circulation of the gases to reheat the glass. Fig. 3 is a partial plan view partly in section, indicated by the line III. III. of Fig. 1. Fig. 4 is a cross section on the line IV. IV. of Fig. 1. Fig. 5 is a sectional detail view showing a floating dam.

2 represents a tank or furnace in which the main body of molten glass is held and maintained with which communicates a chamber 3, preferably extending outwardly at the end of the tank within inclosing walls 4, in which the level of molten glass is always maintained uniform with the level in the main tank.

5 is a covering top for the chamber 3 set upwardly above the level of the glass and the wall 4, sufficient to provide a space 6 through which the gases or air may circulate, the said cover being provided with one or more openings 7, preferably circular, through which the cylinder 8 may be drawn as illustrated in Fig. 1. The diameter of the opening 7 is designed with relation to the diameter of the cylinder to be drawn as to somewhat closely approach the cylinder leaving a slight intervening space, whereby the incoming air through the drawing operation will circulate around the exterior of the cylinder cooling it and facilitating the drawing operation.

The front wall 9 of the tank 2 constitutes a flue for either the gases of combustion or as an inlet for the incoming air, being provided with a hollow interior flue 10 passing up through the wall 9, and into a stack 11 of any desired height, to create the necessary draft, which may be if desired provided with a damper 12 to cut off or open the circulation, although this is not absolutely necessary.

13 is a shut-off gate of suitable refractory material located within the flue 10, and vertically movable therein by means of connection 14, and lever at other raising or lowering mechanism 15, whereby the gate may be lowered into or below the surface of the molten glass as shown in Fig. 1, or raised above it as in Fig. 2. The cut-off is provided at its bottom with a tapered edge $a$ and at each end with inwardly beveled ends $b$ as clearly shown in Fig. 4. The advantage of such construction is that the gate readily enters the glass by its thin edge, while leaving the glass raised without raising with it and adhering excess glass. I thereby obviate the tendency of the glass to cling to the lower edge of the damper and clog up the flue opening, thus providing a clear opening at all times for passage of the gases and air.

The gate 13 makes a loose fit within the flue 10 permitting of upward circulation of the gases, at one or both sides of the gate, the purpose of which is to permit the incoming air indicated by the arrows in Fig. 1, to circulate upwardly to stack 11.

16 represents a front opening, at the front end of the wall of chamber 3, into which the air may likewise enter, which opening may be closed by the insertion of a brick or other suitable stopper 17, when the circulation is reversed as in Fig. 2.

18 is a flue leading downwardly through the front wall of chamber 3, and communicating therewith through pipe 6 leading outwardly to a stack or any suitable point of discharge.

19 is a shut-off gate or valve adapted to be raised or lowered by threaded stem 20 and hand wheel 21 or by any other suitable means, to open or close the circulation through flue 18.

22 is a closing stopper by which the opening 7 may be closed as in Fig. 2, when the glass is being re-heated in chamber 3 during which time the circulation is outwardly from the tank over the surface of the glass in chamber 3, and downwardly through flue 18 for such a length of time as is necessary to re-heat the surface metal.

As stated above there may be one or more openings 7 all of which may be opened or closed at the same time, or glass may be drawn from either opening by partitioning the chamber longitudinally between each opening, and providing separate cut-off-gates 13 and separate flues 18 for each compartment, thereby rendering each compartment independent of each other, but all communicating with the main body of glass in the tank. As will be obvious flat sheets may be also drawn from chamber 3 by merely arranging the opening 7 to suit, making them long and slot-like in shape.

In Fig. 5, I show a modified construction in which the circulation of the gases from the furnace to the chamber is checked, by a floating dam 13′, adapted to close the opening in the manner indicated and which may be substituted for the gate 13 with good results.

The glass in chamber 3 having been heated to the desired degree of heat imparted to it from the main body and the circulating gases the gate 13 is lowered in the glass completely closing the opening, whereupon the glass in the chamber will become fined. The cover 22 is then removed and the cylinder 8 is formed, the outside air entering around it through openings 6 and 16 cooling the base of the cylinder and further assisting the operation. After the cylinder is drawn to the desired length it may be severed from the mass of glass in chamber 3 by reëstablishing the circulation of the hot gases outwardly from the tank by raising gate 19 and closing opening 16 whereupon the cylinder will be severed and may be removed.

The advantages of the circulation secured by the novel construction will be appreciated by all those familiar with the manufacture of machine drawn glass.

The construction is comparatively simple and cheap, the operations are few and do not involve the raising or lowering of any heavy bodies, and the invention as a whole will be found to greatly simplify the operation of making mechanically drawn glass.

Having described my invention, what I claim is:

1. The combination with the main tank, of a laterally arranged drawing tank having a drawing chamber communicating with and maintaining the level of molten glass continuously with the glass in the tank and provided with a permanent cover having a drawing opening and intervening gas circulation space, a removable cover for said opening, a downwardly and outwardly directed off-take flue communicating with said circulation space, and a controlling valve for said flue, substantially set forth.

2. The combination with the main tank, of a laterally arranged drawing tank having a drawing chamber communicating with and maintaining the level of molten glass continuously with the glass in the tank and provided with a permanent cover having a drawing opening and intervening gas circulation space, a vertically adjustable cut-off gate located between the main tank and said drawing chamber, a removable cover for the drawing opening, a downwardly and outwardly directed off-take flue communicating with said circulation space, and a controlling valve for said flue, substantially set forth.

3. The combination with the main tank, of a laterally arranged drawing tank, a wall provided with a flue leading upwardly between said tanks, and a vertically movable cut-off gate closing the direct circulation of gas from one tank to the other.

4. The combination with the main tank, of a laterally arranged drawing tank having a stationary cover and provided with a flue leading upwardly between said tanks, and a vertically movable cut-off gate closing the direct circulation of gas from one tank to the other.

5. The combination with the main tank, of a laterally arranged drawing tank, having a stationary cover and provided with a flue leading upwardly between said tanks to a stack, and a vertically movable cut-off gate located in said flue.

6. The combination with the main tank, of a laterally arranged drawing tank, an intervening partition wall having a flue leading to a stack, and a vertically movable cut-off gate located in said flue.

7. The method of making glass cylinders consisting in drawing the cylinder from a tank communicating with a main tank, establishing a circulation of incoming cooling air from the atmosphere around the base of the cylinder to reduce the temperature of the glass at the zone of formation, establishing a circulation of heated air at the zone of severance to divide the completed cylinder from the mass of glass, and then establishing or continuing the circulation of heated air across that portion of the molten glass from which the cylinder was drawn, substantially as set forth.

In testimony whereof I affix my signature in presence of two witnesses.

ROGER S. PEASE.

Witnesses:
O. M. CLARKE,
CHAS. S. LEPLEY.

---

Correction in Letters Patent No. 967,966.

It is hereby certified that in Letters Patent No. 967,966, granted August 23, 1910, upon the application of Roger S. Pease, of Allegheny, Pennsylvania, for an improvement in "Glass-Furnaces and Methods of Manufacturing Glass Articles Therein," an error appears in the printed specification requiring correction, as follows: Page 1, line 75, the word "at" should read *or;* and that the said Letters Patent should be read with this correction therein that the same may conform to the record of the case in the Patent Office.

Signed and sealed this 23rd day of August, A. D., 1910.

[SEAL.]

F. A. TENNANT,
*Acting Commissioner of Patents.*

It is hereby certified that in Letters Patent No. 967,966, granted August 23, 1910, upon the application of Roger S. Pease, of Allegheny, Pennsylvania, for an improvement in "Glass-Furnaces and Methods of Manufacturing Glass Articles Therein," an error appears in the printed specification requiring correction, as follows: Page 1, line 75, the word "at" should read *or;* and that the said Letters Patent should be read with this correction therein that the same may conform to the record of the case in the Patent Office.

Signed and sealed this 23rd day of August, A. D., 1910.

[SEAL.]

F. A. TENNANT,
*Acting Commissioner of Patents.*